(12) United States Patent
Clark, III et al.

(10) Patent No.: US 6,532,696 B2
(45) Date of Patent: Mar. 18, 2003

(54) HOLDER FOR LIQUID INSECT BAIT

(75) Inventors: William Stewart Clark, III, St. Louis, MO (US); Thomas David Kraatz, Glendale, MO (US)

(73) Assignee: Senoret Chemical Company, Kirkwood, MO (US)

( * ) Notice: Subject to any disclaimer, the term of this patent is extended or adjusted under 35 U.S.C. 154(b) by 0 days.

(21) Appl. No.: 09/910,550

(22) Filed: Jul. 23, 2001

(65) Prior Publication Data

US 2003/0014903 A1 Jan. 23, 2003

(51) Int. Cl.[7] .................. A01M 1/00; A01M 1/02; A01M 1/10; A01M 1/20
(52) U.S. Cl. ............... 43/131; 43/107; 43/121; 43/132.1
(58) Field of Search ........................... 43/131

(56) References Cited

U.S. PATENT DOCUMENTS

| | | |
|---|---|---|
| 1,236,245 A | 8/1917 | Abadie |
| 1,277,354 A | 9/1918 | Arabian |
| 2,004,123 A | 6/1935 | Loibl, Jr. |
| 4,065,872 A | 1/1978 | Patton et al. |
| 4,485,582 A | 12/1984 | Morris |
| 4,521,987 A | 6/1985 | Knote |
| 4,625,452 A | 12/1986 | Knote |
| 4,648,201 A | 3/1987 | Sherman |
| 4,782,621 A * | 11/1988 | Wissman ............... 43/131 |
| 4,793,093 A | 12/1988 | Gentile |
| 5,048,225 A | 9/1991 | Brandli |
| 5,182,879 A | 2/1993 | Hopkins |
| 5,357,709 A | 10/1994 | Lin |
| 5,406,744 A | 4/1995 | Schneider et al. |
| 5,446,992 A | 9/1995 | Stewart |
| 5,528,854 A | 6/1996 | Antonali et al. |
| 5,548,922 A | 8/1996 | Wefler |
| 5,555,673 A | 9/1996 | Smith |
| 5,685,109 A | 11/1997 | Rimback |
| 5,693,331 A | 12/1997 | Ballard |
| 5,802,761 A | 9/1998 | Demarest et al. |
| 5,873,193 A | 2/1999 | Jenson ............... 43/131 |
| 5,927,001 A | 7/1999 | Ballard et al. |
| 5,943,817 A * | 8/1999 | Miller ............... 43/131 |
| 5,960,585 A * | 10/1999 | Demarest et al. ....... 43/131 |
| 5,983,558 A * | 11/1999 | Las et al. ........... 43/131 |
| 6,041,542 A * | 3/2000 | Payton et al. ......... 43/131 |
| 6,202,341 B1 | 3/2001 | Bernard |

* cited by examiner

Primary Examiner—Michael J. Carone
Assistant Examiner—H. A. Blackner
(74) Attorney, Agent, or Firm—Paul M. Denk

(57) ABSTRACT

A holder for a liquid insect bait, comprises of vacuum or otherwise formed upper and lower halves, which when brought together and sealed about their flanges, form a container for the liquid bait. The back end of the halves contain depression within their flanges, that furnishes a passage for charging the liquid bait into the formed container, when the two halves are sealed together. The bottom of the holder is preformed, to form various cavities, flow passages, chambers, where the liquid bait will flow, by gravity, when charging the station for usage. An entrance cavity at the front of the holder can be instructionally cut, to form an entrance passage for the insects, such as ants, to walk up an inclined ramp to attain access to the liquid bait, as deposited within the various chambers and cavities, during usage of this holder.

6 Claims, 1 Drawing Sheet

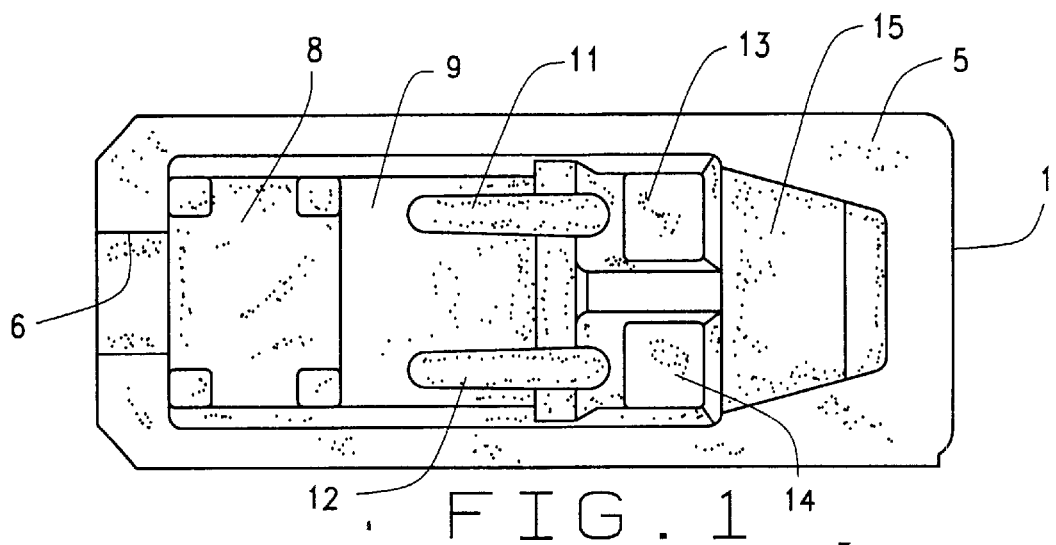
FIG. 1
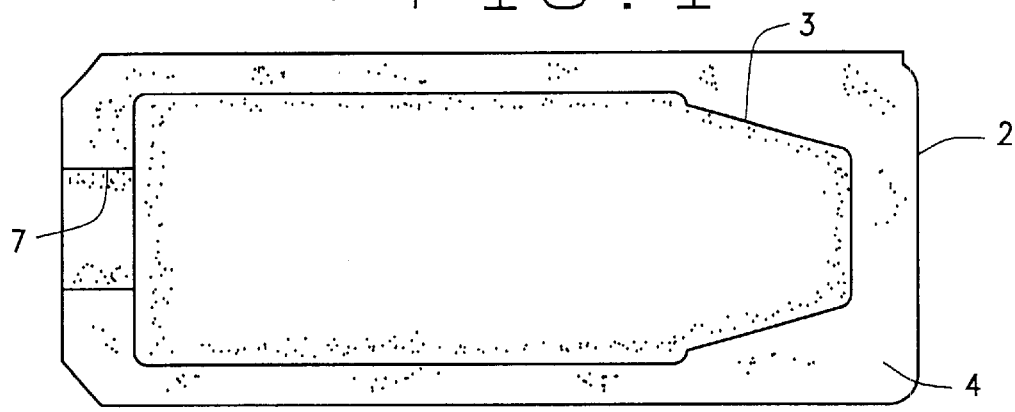
FIG. 2
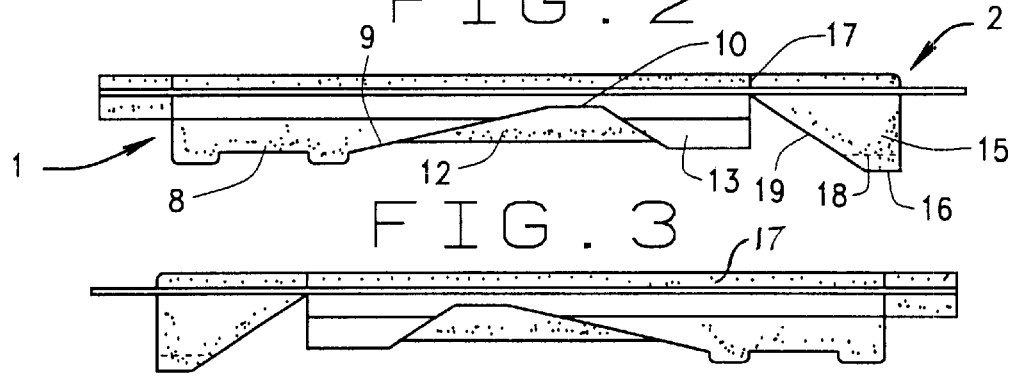
FIG. 3
FIG. 4
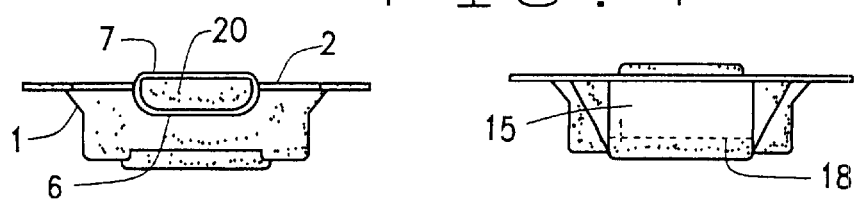
FIG. 5
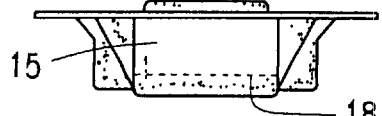
FIG. 6

HOLDER FOR LIQUID INSECT BAIT

CROSS-REFERENCE TO RELATED APPLICATIONS

This application is related to and claims priority upon the prior design patent application filed by the same inventors, upon the appearance of the same invention, filed in the United States Patent and Trademark Office on Nov. 6, 2000, under U.S. Ser. No. 29/132,221.

STATEMENT REGARDING FEDERALLY SPONSORED RESEARCH OR DEVELOPMENT

N/A

BACKGROUND OF THE INVENTION

This invention relates principally to a type of polymer or glass formed bait station, in which a liquid pesticide or insecticide may be applied, and which can be readily placed into usage, by the user, in a safe manner, to effectively eliminate insects and other pests from a given territory.

Numerous types of insect bait stations have been available in the art. Many of these utilize some type of a holder, that may contain a quantity of the insecticide, normally sealed to prevent leakage as during storage, shipment, or marketing, but which can be readily opened to provide its emplacement at a location where insects may be a bother.

For example, a bait station and trap is shown in the U.S. Pat. No. 4,521,987, and shows a form of tamper resistant bait station, but which not necessarily sealed during shipment or storage, and into which pesticide may be located, then reassembled, for usage for elimination of pests, in this particular instance, the mouse or rat.

A similar type development is shown in the prior U.S. Pat. No. 4,625,452, that discloses another variation upon a prior art bait station and trap.

Other variations upon baiting systems can be seen in the early patent to Loibel, Jr., U.S. Pat. No. 2,004,123, upon a pest exterminator. This particular invention discloses the use of a container, with a closure member, for use for holding a poisonous liquid, with the closure member having a pivotal closure plate for attempting to seal the liquid therein, during usage of the exterminator.

The patent to Antonali, et al., U.S. Pat. No. 5,528,854, shows a plastic insect bait assembly.

The patent to Jensen, U.S. Pat. No. 5,873,193, discloses a total control refillable baiting system.

U.S. Pat. No. 6,202,341 shows another reusable pesticide bait station.

Finally, the patent to Bernard, U.S. Pat. No. 6,202,341, discloses a reusable plastic bait station.

In view of the foregoing, and the background state of the art, the enclosed invention provides an improvement upon an easy to use prepackaged bait station that is simple to open, and can be placed in a strategic location to attract and eliminate insects, primarily ants.

SUMMARY OF THE INVENTION

It is the principal object of this invention to provide a bait station for holding a liquid insecticide or pesticide, and which is sealed during storage, shipment and marketing, but which can be readily opened by the end user, for locating safely at the place where insects or other pests, such as ants, readily traverse.

This invention contemplates the formation of a sealed container, which is generally fabricated of two parts, an upper half, and a lower half, the upper half providing generally closure to the bottom half of the container, while the bottom half contains particular contours that afford the location and flowing of the liquid bait, at specific regions of the container, during usage, and generally isolates the positioned liquid bait from the entrance area, once it has been opened to allow access of the insects interiorly of the container, during usage. These upper and lower halves of the sealed container may be vacuum formed, or formed by any other polymer molding process. Essentially, the container includes, in its bottom or base portion, a formed cavity, for retention and holding of the liquid bait, after it is added into the holder, during its assembly. There are one or more channels leading from the first cavity, which is normally arranged rearwardly of the base, to one or more holding reservoirs, forwardly thereof, but yet behind the entrance area, where the insect, such as an ant, can easily attain access into, for stationing themselves in a position for consumption of the liquid bait, leading towards the insects demise.

Any of the liquid baits readily available upon the market may be used with the liquid bait station of the this invention, but particularly those liquid baits that have a greater viscosity to them, such as the Terro® Ant Killer that is readily available from Senoret Company, of St. Louis, Mo., has been found most effective. The heavier viscous type of liquid bait does not splash around, or become displaced from the container, as may normally occur when a regular liquid, with the viscosity of water, is used as a liquid bait in such a holder. Nevertheless, liquids of any viscosity may work, it just requires a little more caution, and careful handling, during the time when the holder is opened, arranged in a horizontal position, and then rested upon a floor base, during its application and usage.

It is, therefore, the principal object of this invention is to provide a liquid ant bait, for use within a holder, and which effectively eliminates and controls sweet-eating ants, when applied.

It is a further object of this invention to provide a sealed holder for a liquid ant bait, which can be prefilled, prior to sealing, and only opened when readied for usage.

Still another object of this invention is to provide a liquid ant bait, within a holder, that is generally odorless, but yet is an effective attractant to ants and other insects, to accelerate their demise.

Still another object of this invention is to provide a holder for liquid ant bait, that may be highly and effectively used by the professional pest control trade, during their treatment programs.

Still another object of this invention is to provide a holder for a liquid ant bait which is reasonably safe, is thin line of construction, and can be put into generally inaccessible areas, so as to keep them from ready access to any children, pets, or the like.

Still another object of this invention is to provide a sealed holder for a liquid ant bait, which when opened, because of its compactness and sealing characteristics, can remain attractive and palatable as a bait for many, many days.

Still another object of this invention is to provide an easy to use bait station.

Yet another object of this invention is to provide a holder for liquid ant bait that can be prepackaged in large numbers within a container, and stored, shipped, marketed, and eventually used, furnishing an ample supply for sustained application.

Yet another object of this invention is to provide a holder for a liquid ant bait packaged within a container that can be easily opened, and act as a highly effective attractant to common pests, such as insects, ants, or the like.

A further object of this invention is to provide a liquid ant bait that may be used both interiorly, or outdoors, because of the unique structure of its assembly, generally resists the inflow of rain water, during common showers.

Still another object of this invention is to provide a container for a liquid ant bait that may be prefilled, after its upper and lower parts are assembled, and once filled with the liquid bait, can be pressure and heat sealed to completely seal in such bait, until readied for usage.

Yet another object of this invention is to provide a holder for a liquid ant bait that may contain a liquid insecticide or pesticide that allows the insect access into and to the bait, where it is ingested, and further allows the insect to traverse from the station, and return to the nest, where it may pass on the killer bait to the rest of the colony.

These an other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings, FIG. 1 provide s a bottom plan view of the holder for liquid ant bait of this invention;

FIG. 2 is a top plan view thereof;

FIG. 3 is a right side view thereof;

FIG. 4 is a left side thereof;

FIG. 5 is a back view of the holder; and

FIG. 6 is a front view of the holder.

DESCRIPTION OF THE PREFERRED EMBODIMENT

In referring to the drawings, and in particular FIGS. 1 and 2, the lower and upper halves 1 and 2, respectively, of the holder for liquid ant bait of this invention are readily disclosed. Both of these halves may be fabricated from a molded polymer, such a polyethylene, propylene, or any other polymer that preferably may be transparent, although such is not essential, to allow ready viewing by the user, so that he/she can see when the liquid bait previously deposited therein has become depleted, or filled with demised insects, and requires replacement.

The upper half 2 of the holder is formed with a slightly elevated central portion 3, to add some clearance within the holder, during its usage. There is a rim 4 provided entirely around the perimeter of the holder, on each half, with the rim 4 of the upper half capable of being sealed with the rim 5 of the lower half 1, such as by heat sealing, or other adhesive, when the holder is assembled. Each of the lower and upper halves have a depression formed therein, as at 6 and 7, which when the upper and lower halves are brought into contact, and sealed together, about their rims or flanges 4 or 5, there is a passage provided between the depressions 6 and 7, that forms a cavity, and through which the liquid ant bait may be deposited, when the holder is charged, for usage. Then, the areas of the depressions 6 and 7 can then be heat sealed together, to completely seal off and close the holder, for storage, shipment, display, retailing, and usage.

When the lower and upper halves 1 and 2 are assembled, and sealed together, about their flanges 4 and 5, they form a container for the deposited liquid ant or other insect bait.

As can further be seen in FIG. 1, the back end of the holder includes a rear cavity 8 which extends downwardly, to form a reservoir, as can also be seen in FIG. 3, for the deposited liquid bait. Then, a ramp extends upwardly, as at 9, to a slightly constricted area 10, but includes one or more formed channels, as at 11 and 12, and through which the liquid bait will flow, to provide for its dissemination, across the bottom of the holder, depositing some of its content into the middle reservoirs 13 and 14, when the holder is applied upon a surface, and readied for usage. All of these cavities 8, the reservoirs 13 and 14, are in communication with each other, as through the integral channels 11 and 12, as previously reviewed.

In addition, there is provided at the front of the holder an entrance cavity 15 having a slightly flattened bottom portion 16 as can be noted. There is passage between the entrance cavity 15, and into the middle reservoirs 13 and 14, by way of the formed channel 17, generally provided along the interior and underside of the centrally heightened area 3, of the upper half 2 of the holder, as can be noted.

FIG. 6 discloses a front view of the holder, forming the liquid ant or other insect bait station of this invention, and it can be seen that the front entrance cavity 15 has a line of demarcation provided, as at 18, and it is along this line that the user is instructed to make a cut, through the use of a scissors, knife, or the like, so as to open the entrance area, to allow the insect to crawl thereunder and into the entrance cavity 15, up the shown ramp 19, to attain access to the deposited liquid bait, as in the middle reservoirs 13 and 14, and the rear cavity 8, as previously explained.

Furthermore, as can be noted in FIG. 5, when the holder is readied for application of the liquid bait, its upper and lower halves 2 and 1 will be brought together, as noted, heat sealed around their perimeter, as along the flanges 4 and 5, to form the container for the liquid bait, and further furnishes a passage 20 between the depressions 6 and 7, and through which the liquid bait can be deposited, into the holder, in preparation for its usage. Then, heat and pressure are applied to the depressions 6 and 7, to depressed them and seal them into closure, thereby completely sealing the liquid bait therein, in preparation for usage of the station.

When readied for usage, the user simply positions the holder so that its back end, as shown in FIG. 5, is arranged downwardly, so all of the liquid, sealed therein, will flow to the back end of the holder. Then, with the use of a knife, scissors, or the like, as previously explained, a cut is made in the entrance cavity 15 along the demarcation 18, so as to provide an opening to the otherwise previously sealed container. Then, the bait station may be rested on a level surface, preferably at a location that is inaccessible to children, pets, or the like, but yet readily available to the insects desired to be eradicated. At this time, when arranged horizontally, with its lower half 1 resting downwardly, upon the floor, the liquid will flow, as previously explained, between the cavity 8, and the reservoirs 13 and 14, in ready position for access to the insects, for their ingesting of the bait, and either dying in situ, or carrying the feed back to the colony, so as to spread the insecticide or pesticide to the other members of the family, and cause their demise. Once the bait has been totally consumed, or attains staleness to the extent that it is no longer an attractant to the insects, it can be wrapped and discarded.

Variations or modifications to the subject matter of this invention may occur to those skilled in the art upon reviewing the description of this invention. Such variations, if within the scope and spirit of this invention, are intended to be encompassed within the scope of any claims to invention made herein. The description of the preferred embodiment, as shown in the drawings, are set forth for illustrative purposes only.

Having thus described the invention, what is claimed and desired to be secured by Letters Patent is:

1. A holder for liquid insect bait, said holder formed as a container, and having an upper half and a lower half, each of the upper half and lower half having a perimeter flange extending around their perimeter, said flanges capable of entering into contiguity when the upper and lower halves are brought together to form the container, and said flanges capable of being sealed together to form a fluid tight container thereat, the interior of the container having a cavity formed therein, and into which the liquid insect bait is deposited, said container having a front end and a back end, the back end of the container having a rear cavity formed therethrough, between the container flanges, so that the liquid insect bait can be deposited therethrough initially, and the cavity being sealed, between the flanges, once a sufficient amount of liquid insect bait has been deposited therein, the front of the container having an area disposed for being cut to provide an opening into the container through which the insects may attain access therein when preparing the holder for usage, said cavity within the container forms a rear cavity therein, and in which the liquid insect bait locates during usage of the holder, and entrance cavity formed at the front of the container, and into which the insects attain access upon entering into the holder, and a passage leading from the entrance cavity to the rear cavity to allow the insects to attain access to the liquid bait, said container including at least one intermediate reservoir communicating with the entrance cavity, to allow the insects to become staged, before moving through the passage to attain access to the rear cavity and the liquid bait contained therein.

2. The holder for liquid insect bait of claim 1 and wherein there are two intermediate reservoirs communicating with the entrance cavity.

3. The holder for liquid insect bait of claim 2 and wherein said passage being the intermediate reservoirs and the rear cavity comprising at least a pair of channels.

4. The holder for liquid insect bait of claim 2 and wherein said entrance cavity having a location for cutting to provide an opening into the container for the holder and through which the insects may traverse to attain access into its container.

5. The holder for liquid insect bait of claim 4, and wherein said area of cutting of the entrance cavity providing a line of demarcation to indicate where a cut should be made to provide an opening into the container.

6. The holder for liquid insect bait of claim 1 wherein the rear cavity of the container is provided for holding a liquid insect bait.

* * * * *